UNITED STATES PATENT OFFICE.

CHARLES B. TRESCOTT, OF CHICAGO, ILLINOIS.

PROCESS OF PREPARING MEATS FOR LOW-TEMPERATURE COOKING.

1,285,845. Specification of Letters Patent. Patented Nov. 26, 1918.

No Drawing. Application filed May 4, 1918. Serial No. 232,468.

*To all whom it may concern:*

Be it known that I, CHARLES B. TRESCOTT, a citizen of the United States, residing at Chicago, in the county of Cook and State of Illinois, have invented a new and useful Improvement in Processes of Preparing Meats for Low-Temperature Cooking, of which the following is a specification.

In the art of low-temperature cooking of cured or pickled meats, such as hams, tongues, corned beef and the like meats in chunk form, which cooking may be, for example, in accordance with my Patent No. 1,226,147, dated May 1, 1917, it is common practice to take the meats, without reference to their being all of uniform temperature throughout but as they come out of the pickling cellars, and introduce them into the cooking chamber to undergo low-temperature cooking.

It is customary for hams, for which my present improvement is particularly designed, so that the description hereinafter contained is confined to the treatment of hams, to wrap each ham, before introducing it into the cooking chamber, in cloth or canvas and introduce the wrapped ham into a sheet-metal cylindrical shaper open at both ends.

The proper temperature for thus cooking hams, in accordance with the procedure of my aforesaid patent, is about 145° F. When the meat comes out of the cellar, after it has been exposed in piles for a time, as it nearly always is, it attemperates unevenly, particularly in warm weather. Thus the outer layers may acquire a temperature of say 70° F. on a warm day throughout each chunk, before introduction into the cooking chamber, while the temperature of the under layers may be as low as 45° F. It is disadvantageous to subject the ham to the cooking temperature in that condition of difference between the temperature of individual hams. The cooking temperature, of say 145° F., when applied to hams lacking uniform temperature throughout, will penetrate the warm hams with relative rapidity, but will take much longer to overcome the relatively cold temperature in other hams. The consequence is since the meat must be cooked through, that the relatively warmer hams become "overcooked," in the sense of breaking down the cells and producing shrinkage and consequent loss because of the longer time required for cooking the colder hams.

It is the object of my invention to overcome the disadvantages referred to, and this I accomplish by attemperating the meat preparatory to subjecting it to low-temperature cooking, to render it of uniform temperature, say 90° F., and this I accomplish, by preference, in the following manner: The hams taken out of the cold cellar are first each wrapped in canvas and inserted into a sheet-metal shaper. In this condition, the wrapped and incased hams are laid in layers on racks upon trucks and carted into an attemperating room, which may be steam-heated and which should be as free as possible from air currents, the temperature of this room being say from 90° to 100° F. The meat remains in this room until it has become of uniform temperature throughout, say from 80° to 90° F., and a thermometer is introduced into the center of each of one or more hams to show when the predetermined temperature has been attained. This may take from eight to twelve hours, depending upon the thickness of the hams.

When thus uniformly attemperated, the hams are ready to be cooked, and are introduced in wrapped and incased condition for the purpose into a low-temperature cooker. The initial temperature being thus uniform, the heat of cooking penetrates the meat more rapidly, by reason of the fact that by thus preparatorily raising the temperature of the meat the cells have become expanded by rarefaction of their contained air, and therefore offer less resistance to penetration of the cooking heat, and cooks it more uniformly throughout, thereby avoiding any overcooking and consequent loss by shrinkage.

While I have described my improvement more particularly with reference to the procedure in accordance with my aforesaid patent, wherein steam affords the primary source of heat, its advantages are even greater where the meat is cooked in hot water at the proper temperature for low-temperature cooking (say 160° to 165° F.), because the temperature of the water has only uniform conditions of temperature in the hams to overcome (the temperature of water being higher than the temperature of steam when thus employed as a low-temperature cooking medium) instead of having to overcome varying temperatures in the different hams. All of the hams being initially of uniform temperature throughout, the cooking is expedited and the hams are not subjected to the higher temperature for a sufficiently long time to unduly overcook their outer portions.

It may be stated that in practically employing my present improvement I find that it produces a saving in shrinkage of fully one per cent. when employed with the procedure in accordance with my aforesaid patent.

I claim:

1. Preparing cured meats for low-temperature cooking by raising them from relatively low-temperature to substantially uniformly higher temperature throughout, preparatory to subjecting them to the still higher temperature required for the cooking operation.

2. Preparing cured meats for low-temperature cooking by wrapping each piece in cloth and inclosing it in an open-ended shield, and raising the incased meats from a relatively lower to a higher substantially uniform temperature throughout, preparatory to subjecting them to the still higher temperature required for the cooking operation.

3. Preparing cured meats for low-temperature cooking by wrapping each piece in cloth, introducing the wrapped piece into an open-ended shield and raising the temperature of the meats from their relatively lower temperatures to a temperature substantially uniform throughout the meats of about 80° to 90° F. preparatory to subjecting them to the still higher temperature required for the cooking operation.

CHARLES B. TRESCOTT.